Jan. 23, 1945. T. METCALFE 2,367,957
MACHINE FOR THE GRINDING OF SCREW THREADS
Filed Oct. 8, 1943 4 Sheets-Sheet 1
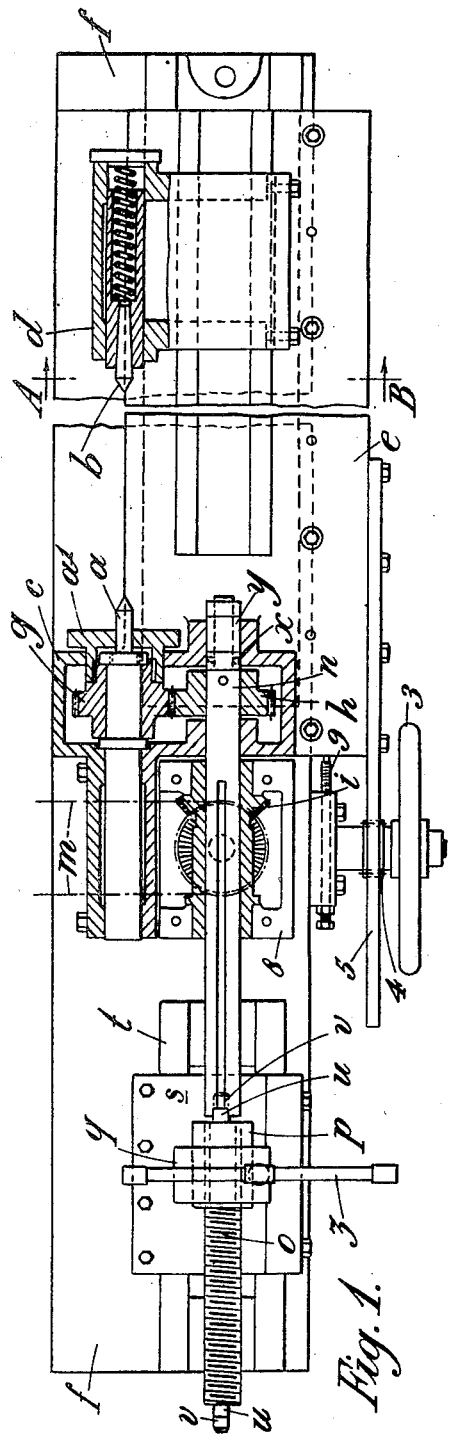
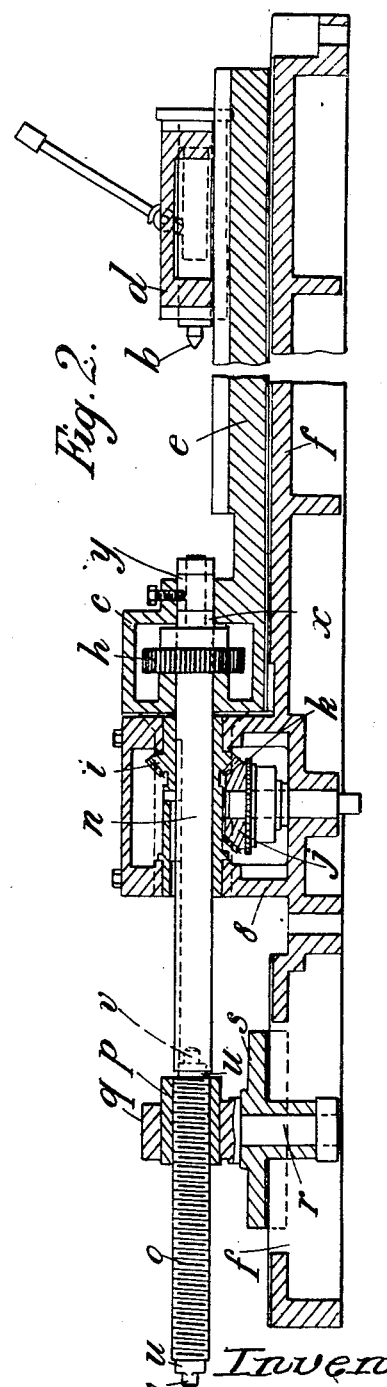
Fig. 1.
Fig. 2.
Inventor
T. Metcalfe
By Gherick Dorning Duhls Attys Jan. 23, 1945.　　　T. METCALFE　　　2,367,957

MACHINE FOR THE GRINDING OF SCREW THREADS

Filed Oct. 8, 1943　　　4 Sheets-Sheet 2

Inventor
T. Metcalfe

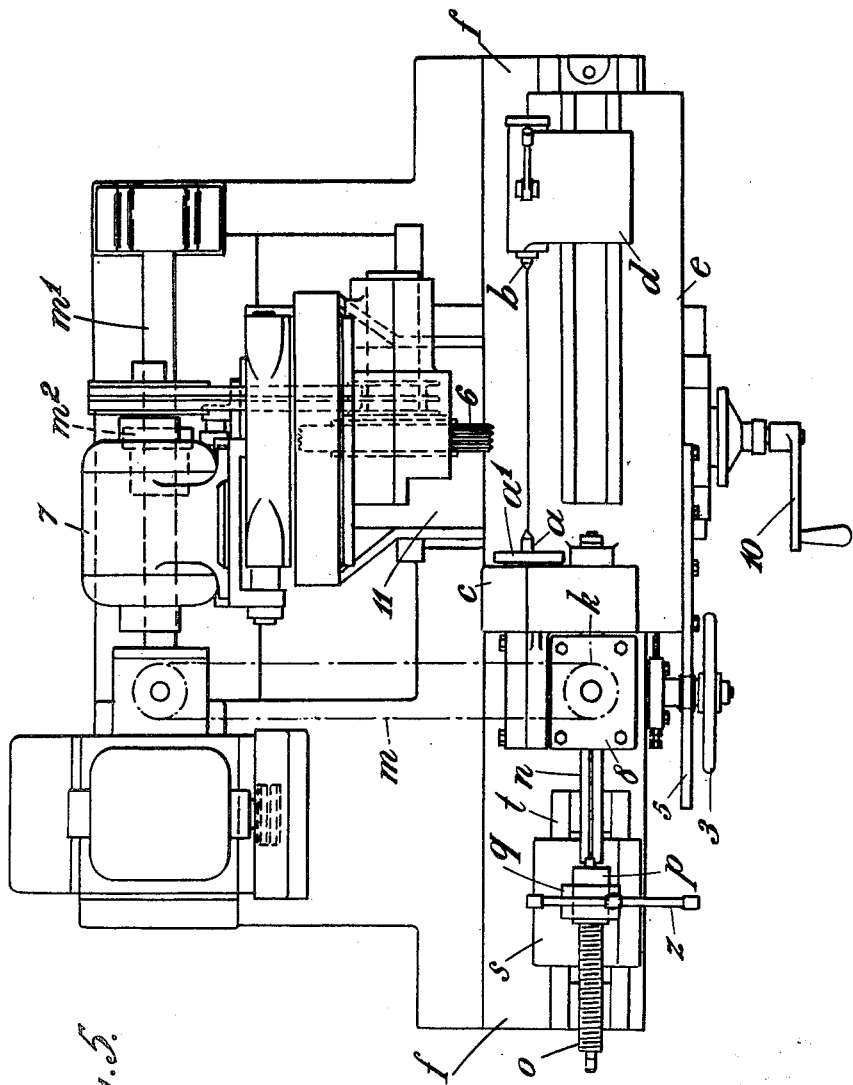

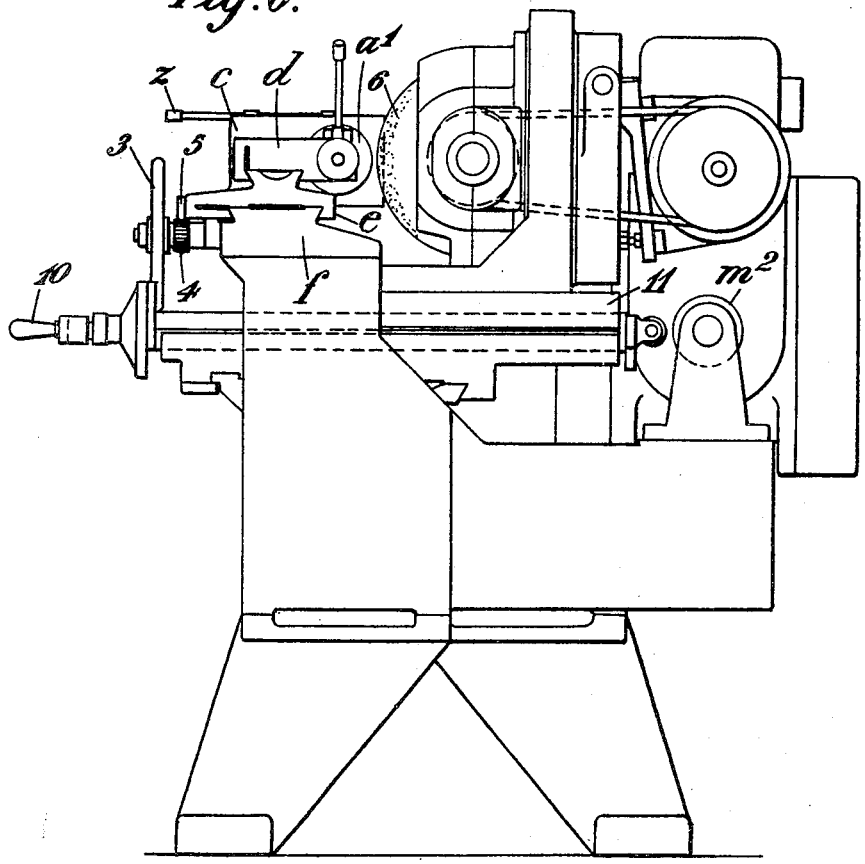

Patented Jan. 23, 1945

2,367,957

UNITED STATES PATENT OFFICE 2,367,957

MACHINE FOR THE GRINDING OF SCREW THREADS

Thomas Metcalfe, Birkby, Huddersfield, England

Application October 8, 1943, Serial No. 505,528
In Great Britain November 19, 1942

2 Claims. (Cl. 51—95)

This invention has for its object to provide an improved machine for the accurate grinding of screw threads.

The invention consists in a machine for the grinding of screw threads, in which the fast and loose headstocks are on a saddle traversible on the machine bed across the face of the grinding wheel by a master screw which is turned in unison with the rotation of the workpiece.

The invention further comprises in combination, a bed, a saddle traversible upon said bed parallel to the axis of the grinding wheel, fast and loose headstocks upon such saddle, a driving shaft journalled on the machine bed driving the workpiece between the fast and loose headstocks, a master screw mounted in a part on the machine bed in axial alignment with said shaft and rotated thereby, the axial movement of the said master screw traversing the shaft axially and through it traversing the saddle.

Referring to the accompanying explanatory drawings—

Figure 1 is a sectional plan view, Figure 2 a sectional elevation, Figure 3 an end elevation looking from left to right in Figure 1, and Figure 4 a cross sectional view on the line AB of Figure 1, showing the essential parts of a machine for grinding screw threads, constructed in one convenient form in accordance with this invention.

Figure 5 is a plan view and Figure 6 an end elevation of the machine.

The work carrying centres $a$ and $b$ are carried in headstocks $c$ and $d$ upon a saddle $e$ traversible on the machine bed $f$. The drive to the face plate $a^1$ of the fast headstock is by spur gears $g$ and $h$, bevel gears $i$ and $j$, and a chain wheel $k$ driven by the chain $m$ from the drive to the shaft $m^1$ which has a cam $m^2$ thereon (see Figure 6) which is in operation during plunge cut grinding only in order to impart feed movements to the slide $11$ carrying the grinding head and grinding wheel $6$. $7$ is the motor which revolves the wheel $6$. The shaft $n$ carrying the bevel wheel $i$ and the spur wheel $h$ serves to turn the master screw $o$ in a nut $p$ held in a clamp $q$, which has a stem $r$ which can swivel in a slide $s$. The latter can be clamped in any desired position upon a V $t$ on the machine bed $f$. The housing $8$ of the drive to the shaft $n$ and of the bevel pinion $i$ is secured to the machine bed $f$.

The master screw $o$ may be shaped alike at both ends so that either end can be coupled to and turned by the shaft $n$. As shown, each end of the screw $o$ has a tongue $u$ and a locating centre pin $v$ thereon which can enter a cross slot and centre hole in the end of the shaft $n$.

The gear wheels $g$ and $h$ are similar so that one turn of the shaft $n$ causes one turn of the master screw $o$ and one turn of the driving plate $a^1$.

It will be appreciated that the fixed headstock $c$ has within it the journal bearings of the shaft $w$ carrying the gear wheel $g$ and the work driving face plate $a^1$, also the gear wheel $h$, and the end of the shaft $n$ which has a shoulder thereon pressing against a thrust bearing $x$ and a collar $y$ secured in the headstock $c$.

Figure 3:
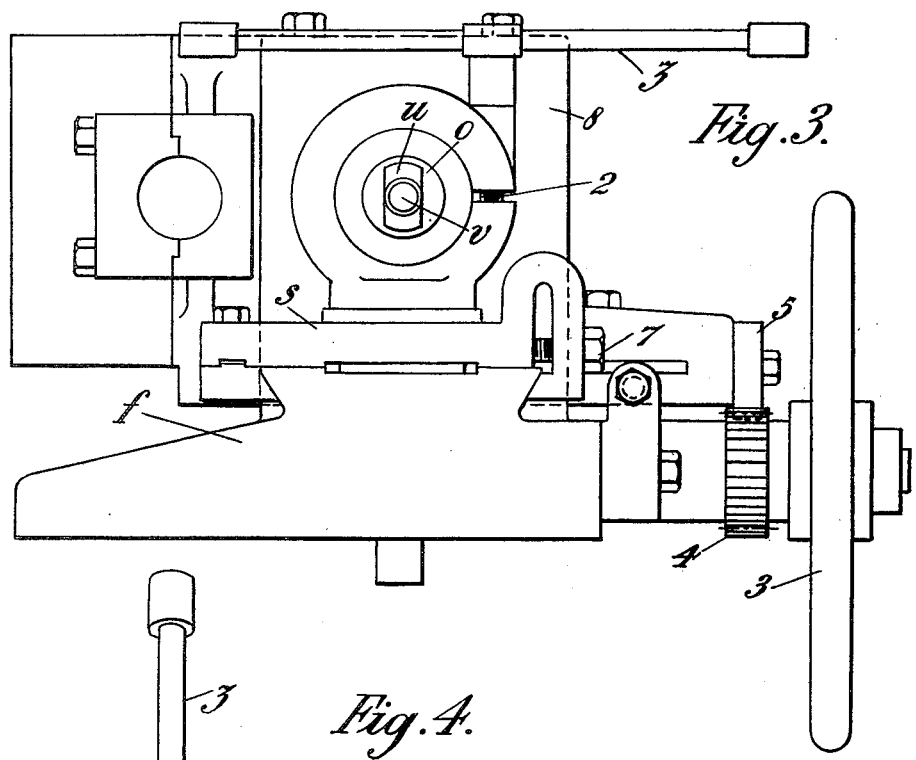
Figure 4:
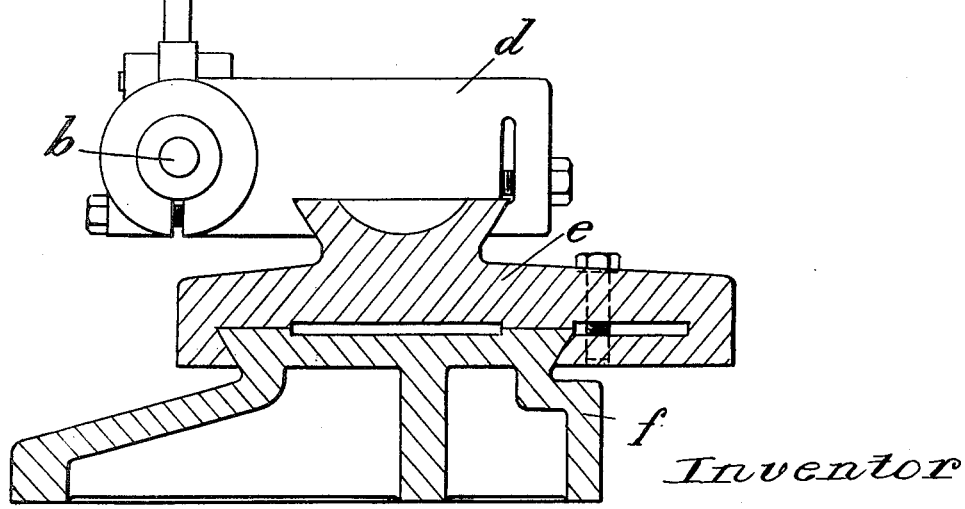

The split clamp $q$ around the nut $p$ is opened and closed by turning the handle $z$ upon the screw $2$ (Figure 3).

The saddle $f$ is traversible by the handwheel $3$ turning a pinion $4$ engaging a rack $5$ secured to the saddle. An adjustable abutment or stop $9$ limits the movement of the saddle $e$ to the left in Figure 1. The handle $10$ is for setting the grinding wheel slide $11$.

It will be seen that as the driving face plate $a^1$ is revolved, the master screw is turned by the shaft $n$ and this results in the saddle $e$ being traversed at a rate for each revolution of the face plate which depends upon the pitch of the master screw. The workpiece will therefore be traversed axially relatively to the grinding wheel to effect grinding of the threads upon the workpiece. If desired the centres $a$ and $b$ may be in axial alignment with the shaft $n$ so that the latter directly traverses the saddle $e$ and revolves the workpiece.

When the lead screw $o$ has been traversed for its full length, the clamp $q$ is released, so allowing the nut $p$ and the master screw to be moved back sufficiently to uncouple the screw from the shaft $n$. The clamp can then be swivelled around to bring the other end of the screw into service position. The saddle $e$ is moved backwards by the wheel $3$, the screw $o$ and shaft re-coupled and the clamp $q$ tightened on the nut $p$.

The slide $s$ is locked to the V $t$ by the screwed studs $7$ (Figure 3) in a position to suit the master screw (which is changed to suit the pitch of thread being ground) and the length of traverse of the saddle $e$ desired at each grinding operation.

The fast headstock $c$ can be either at the right or the left of the loose headstock $d$ to grind threads of one or other hand.

What I claim is:

1. A machine for the grinding of screw threads, comprising in combination, a bed, a saddle traversible upon said bed parallel to the axis of the grinding wheel, fast and loose headstocks upon such saddle, a driving shaft parallel with the machine centres on the fast and loose headstocks and journalled on the machine bed, the said shaft driving the workpiece between the said centres, a master screw mounted for swivelling and rotation in a part on the machine bed in axial alignment with said shaft which also rotates the master screw, the axial movement of the said master screw when rotated traversing the shaft axially and through it traversing the saddle, and the swivelling movement of the screw enabling the end which is in service to be changed.

2. In a machine as claimed in claim 1, a slide adjustable upon said bed away from and towards the driving shaft, a swivelling holder mounted in said slide, a nut secured in said swivelling holder, and the master screw threading through the nut.

THOMAS METCALFE.